United States Patent [19]
Duffield

[11] Patent Number: 5,194,954
[45] Date of Patent: Mar. 16, 1993

[54] AUTOMATIC CHANNEL SAMPLING PICTURE-IN-PICTURE CIRCUITRY

[75] Inventor: David J. Duffield, Indianapolis, Ind.

[73] Assignee: Thomson Consumer Electronics, Inc., Indianapolis, Ind.

[21] Appl. No.: 547,089

[22] Filed: Jun. 29, 1990

[51] Int. Cl.$^5$ .............................................. H04N 5/50
[52] U.S. Cl. ................................ 358/193.1; 358/190; 358/183; 358/191.1; 455/185.1; 455/161.1; 455/180.1
[58] Field of Search ....................... 358/183, 22, 193.1, 358/191.1, 188, 190, 189; 455/150, 161, 185, 186, 179

[56] References Cited

U.S. PATENT DOCUMENTS

| | | | |
|---|---|---|---|
| 4,241,450 | 2/1980 | Blatter et al. | 455/179 |
| 4,287,601 | 9/1981 | Borg et al. | 455/186 |
| 4,495,654 | 1/1985 | Deiss | 455/186 |
| 4,665,438 | 5/1987 | Miron et al. | |
| 4,729,027 | 3/1988 | Hakamada et al. | |
| 4,750,040 | 6/1988 | Hakamada | 455/185 |
| 4,763,195 | 8/1988 | Tults | 358/195.1 |
| 4,774,582 | 9/1988 | Hakamada et al. | |
| 4,837,627 | 6/1989 | Mengel | 358/188 |
| 4,860,380 | 8/1989 | Mengel | 455/185 |
| 4,897,727 | 1/1990 | Richards | 358/188 |
| 4,903,129 | 2/1990 | Bell et al. | 358/183 |
| 4,914,516 | 4/1990 | Duffield | 358/188 |
| 4,918,531 | 4/1990 | Johnson | 358/183 |
| 5,144,438 | 9/1992 | Kim | 358/193.1 |

FOREIGN PATENT DOCUMENTS

| | | |
|---|---|---|
| 2619663 | 2/1989 | France. |
| 2043377 | 10/1980 | United Kingdom. |
| 2072444 | 9/1981 | United Kingdom. |
| 2208981 | 4/1989 | United Kingdom. |

Primary Examiner—James J. Groody
Assistant Examiner—Jeffrey S. Murrell
Attorney, Agent, or Firm—Joseph S. Tripoli; Peter M. Emanuel; Thomas F. Lenihan

[57] ABSTRACT

An automatic channel sampler system, including a television signal tuner, displays an array of inset pictures on a display screen each time the receiver is turned on. Each inset picture is a still video picture (i.e., freeze-frame) selected by tuning each of the channels in a scan list of channels. Automatic channel sampling is initiated in response to the development of operating power, and is performed while the picture tube is dark during the time in which the picture tube is warming up. A separate user-enterable scan list may be provided for either the automatic channel sampling function, a manually initiated channel sampling function, or both. The separate scan list may be programmed to contain only those channels which the viewer regularly watches, and would have the triple advantages of excluding the sampling of channels carrying programming which is not of interest to the viewer, presenting the sampled images in whatever order is desired by the user, and shortening the time necessary to complete the channel sampling function by eliminating the sampling of the undesired channels.

11 Claims, 5 Drawing Sheets

AUTOMATIC CHANNEL SAMPLING PICTURE-IN-PICTURE CIRCUITRY

CROSS REFERENCE TO A RELATED PATENT APPLICATION

A patent application No. 07/510,712 (Emanuel), filed herewith and are abandoned, concerns related subject matter.

FIELD OF THE INVENTION

This invention relates to the field of television receivers having picture-in-picture capability.

BACKGROUND OF THE INVENTION

Many modern television receivers have picture-in-picture ("PIP", or "PIX-IN-PIX") capability, that is, the capability of combining video signals from two different sources to produce a signal which when displayed includes a first program in a main viewing area, and a second program in a secondary (inset) viewing area of the same display screen.

It is known in the art to produce a multi-picture ("multipix") display by generating a 3×3 or 3×4 matrix of small still (i.e., freeze-frame) pictures. These small still pictures are produced by storing a series of "snap-shot-like" still images to form a display of pictures having a fixed time interval between frames.

It is also known to use the multipix technique to implement a "channel guide" or "channel sampling" feature which displays an array of still inset images representative of the programs on each of the channels included in a scan list of preselected channels (i.e., a "scan" list) stored in memory. These displays are produced by initiating the tuning of a channel, waiting a predetermined time while the tuner performs the the tuning operation, storing a frame of video from that channel, tuning the next channel from the scan list, and so on. A 3×4 matrix of images of this type, captured from 12 television channels, is illustrated in prior art FIG. 3. In addition to the images corresponding to the television programs, the respective channel numbers are also displayed. Such a system is known from the RCA VPT-695 videocassette recorder, sold by Thomson Consumer Electronics, Inc., Indianapolis, Ind.

SUMMARY OF THE INVENTION

It is recognized herein that apparatus according to the subject invention, for automatically initiating the "channel guide" mode of operation when the receiver is turned on by a user is highly advantageous for several reasons. Sometimes, a user may not know what is "on" (i.e., what programs are currently available for viewing), and the automatic channel guide feature avoids the necessity of having to scan sequentially through the channels. Because a viewable picture is not available for several seconds while the receiver is "warming up", this time is used for accumulating and storing the video image for each channel to be displayed in the channel guide array. Thus, the user does not have to wait an additional time after "warm-up" for the channel guide display, as is the case when a user manually activates the channel guide operation when a viewable picture is obtained after "warm-up". These and other features of the invention will be described with reference to a preferred embodiment.

DETAILED DESCRIPTION OF THE EMBODIMENT

Figure 1:
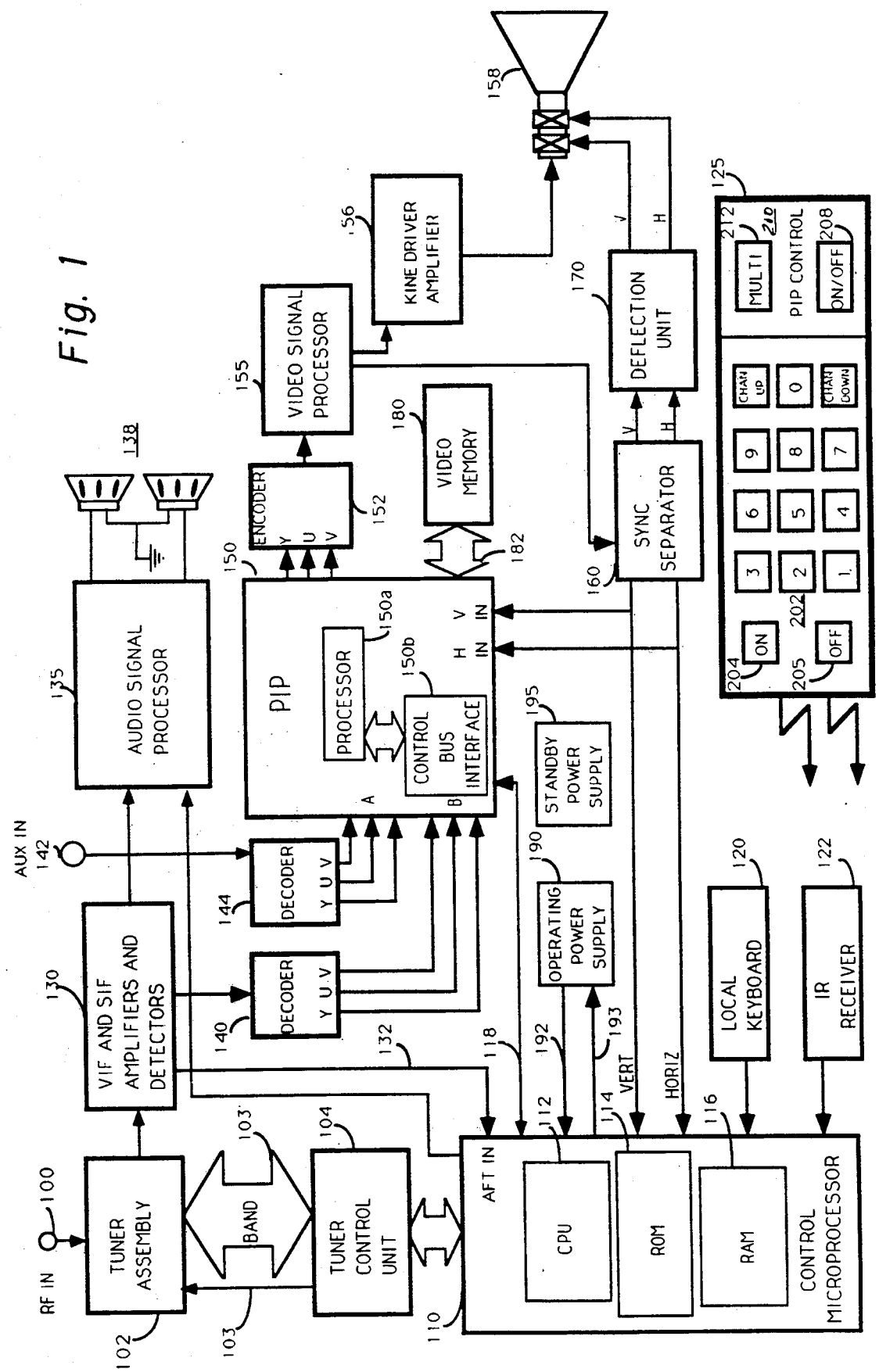
FIG. 1 illustrates, in block diagram form, an embodiment of the invention.

Referring to FIG. 1, radio frequency (RF) signals are applied to an RF input terminal 100 of a tuner assembly 102. Tuner assembly 102 selects a particular RF signal under control of a tuner control unit 104 which applies a tuning control signal to tuner assembly 102 via a wire 103, and applies bandswitching signals via a control bus 103'. Tuner control unit 104 is controlled by a controller 110. Controller 110, which may be a microprocessor or microcomputer, includes a central processing unit (CPU) 112, a read-only memory (ROM) 114, and a random access memory 116. Controller 110 receives user-entered control signals from a local keyboard 120 and from an infrared (IR) receiver 122. IR receiver 122 receives and decodes remote control signals transmitted by a remote control unit 125.

Tuner 102 produces a signal at an intermediate frequency (IF) and applies it to a processing unit 130 comprising a video IF (VIF) amplifying stage an AFT circuit, and video detector, and a sound IF (SIF) amplifying stage. Processing unit 130 produces a baseband video signal (TV), and a sound carrier signal. The sound carrier signal is applied to an audio signal processor unit 135 which includes an audio detector and a stereo decoder. Audio signal processor unit 135 produces baseband left and right audio signals and applies them a pair of speakers 138 for sound reproduction. The AFT circuit of processing unit 130 also produces a signal from which AFT crossover is detected and applies it via line 132 to controller 110, as will be explained in detail below.

The baseband video signal (TV) is coupled to a decoder 140 which produces a luminance Y signal, and U and V color component signals. A video input terminal 142 labelled AUX IN is provided for receiving a baseband video signal from an external source. The externally supplied baseband video signal is applied to a second decoder unit 144 which also produces a luminance Y signal, and U and V color component signals. The respective Y, U, and V signals are applied to input ports A and B of a picture-in-picture (PIP) processing unit 150.

PIP unit 150 includes a processor unit 150a for processing the applied video signals, and a control bus interface unit 150b for communicating with controller 110 over a serial control bus 118. Serial control bus 118 couples command data from controller 110 which controls PIP unit 150 to produce an image for display having a main (or primary) picture and an inset (or secondary) picture. Under controller command, via serial bus 118, the PIP function may be enabled and disabled, and the inset picture may be displayed, for example, in each of the four corners, or in several other areas. Also under controller command via serial bus 118, PIP unit 150 may be controlled to interchange (swap) the main and inset television images.

The output Y, U, and V signals of PIP unit 150 are applied to an encoder unit 152 which converts them into a composite video signal for further processing by video signal processor unit 155 and a kine driver amplifier 156 and ultimately displayed on a display screen of a display device 158. Video signals are also applied to a sync separator unit 160 which derives vertical and horizontal synchronizing signals therefrom. The derived vertical and horizontal signals are applied to controller 110 and to a deflection unit 170 for the production of deflection signals for application to the yoke assembly of display device 158.

PIP unit 150 is coupled to a video memory unit (video RAM) 180 by a data bus 182. Video RAM 180 is preferably large enough to store one field of a television picture (i.e., field store memory). The term field store memory as used herein means a memory capable of storing 220 television lines of data wherein each television line comprises 512 8-bit bytes of data. It should be noted that controller 110 can cause PIP unit 150 to address any individual memory location of video RAM 180, by sending the appropriate command over serial control bus 118. PIP unit 150 has a VS IN input for receiving vertical rate synchronizing signals and an HS IN input for receiving horizontal rate synchronizing signals from sync separator unit 160. Sync separator unit 160 also couples horizontal and vertical synchronizing signals to respective input terminals of controller 110.

IR receiver 122 receives IR signals transmitted by a remote control handunit 125. Remote control handunit 125 includes keys generally designated as 202 for entering the digits 0-9, for entering "channel-up" and "channel-down" commands and a key 204 for turning the receiver "on" and a key 205 for turning the receiver "off." Remote control handunit 125 also includes an array of keys generally designated as 210 (labelled PIP CONTROL) including a key 208 (labelled ON/OFF) for turning the picture-in-picture function on and off, and a key 212 (labelled MULTI), the operation of which will be described below. Remote control handunit 125 includes therein electronic circuitry (not shown) for encoding a signal to be transmitted by an IR diode in accordance with the particular keys pressed.

FIG. 1 also includes an operating power supply 190, and a standby power supply 195. Standby power supply 195 supplies power to controller 110, local keyboard 120, and IR receiver 122 when the television receiver is turned off. Operating power supply 190 is activated by controller 110 via line 193 in response to a power on command initiated by a user. An "operating power supply ready" signal, indicative of the development of operating power, is applied to controller 110 via a line 192. The operating power supply ready signal may be a momentary signal which is generated only when the receiver is first turned on by the user. Alternatively, the operating power supply ready signal may be a steady state signal derived from the operating power supply voltage, which need only be sampled for a transition from a low level to a high level. As will be explained in greater detail below, the operating power supply ready signal is used to initiate an automatic channel sampler mode of operation.

Before describing automatic channel sampling operation, a brief description of manual activation of channel sampling mode of operation is helpful.

When a user presses MULTI key 212, controller 110 controls PIP unit 150 via serial bus 118 to enter the "channel sample" mode mentioned above. In the channel sample mode of operation, controller 110 supplies band selection and tuning signals to cause tuner 102 to tune the lowest channel stored in a scan list previously stored in memory by a user, or possibly the lowest channel in a list of active channels as determined by a previously activated search for active channels (i.e., autoprogramming).

In the U.S., television channels are allocated to respective radio frequencies in accordance with one of three different standards. Broadcast television frequencies are assigned and regulated by the Federal Communications Commission (FCC). Cable companies, however, employ a second standard by which some cable channel frequencies are slightly offset from the FCC broadcast frequency standards, or a third standard by which some cable channel frequencies are grossly offset from the FCC broadcast frequency standards. So-called cable-ready television receivers use a search algorithm to locate the offset cable channels. The search algorithm may take a relatively long time (up to approximately 1 second). The tuner settling time delay of approximately 1 second used by the above-mentioned RCA VPT-695 allows for the longest tuning time required. Thus, in that system, filling a 3×4 matrix with freeze-frame images from different channels takes about 12 seconds, which may be an undesirably long time for the user to wait.

U.S. Pat. No. 4,914,516 (Duffield) discloses a system which will fill a 3×4 matrix with freeze-frame images from different channels in about 5 seconds. Apparatus according to Duffield uses a feedback signal from the AFT circuitry to indicate completion of tuning of a channel, rather than using the simple time delay of the RCA VPT-695.

Although the teaching of U.S. Pat. No. 4,914,516 is not necessary for practicing the subject invention, it is felt that it is preferable to reduce tuning-time by utilizing the teaching of Duffield. An automatic fine tuning (AFT) signal developed by an AFT section of processing unit 130 is coupled to controller 110 via a line 132 to an input terminal AFT IN of controller 110. Controller 110 samples the AFT signal during the tuning process, after a new channel has been selected. The AFT signal exhibits one of two states indicating increasing tuning frequency and decreasing tuning frequency, respectively. When the amplitude of the AFT signal changes from one state to the other then an AFT crossover is detected, indicating that the frequency of the IF picture carrier is near its nominal frequency (i.e, 45.75 MHz in the U.S.), then the tuning of the new channel is considered complete.

When controller 110 determines that the tuning of a new channel is complete, it causes PIP unit 150 to acquire and store, in video memory 180, a frame of video from the video signal applied to its A input (TV). This is described in greater detail in the above-mentioned U.S. Pat. No. 4,914,516 (Duffield). After issuing the acquire command, controller 110 delays for 50 milliseconds to ensure that a full frame of video has been stored. Controller 110 can then cause tuner 102 to select a second channel. The use of the AFT signal as a feedback signal indicative of a completed-tuning condition, results in a system which is able to fill up the individual inset screens in the display of the channel sample mode, up to 4 times faster than open loop time-delay type systems (i.e., systems in which a predetermined time delay is allowed for tuning each channel), when sampling FCC broadcast standard channels. The time saved when tuning cable channels will vary in accordance with the amount each cable channel is offset from the nominal FCC broadcast standard frequency.

Figure 3:
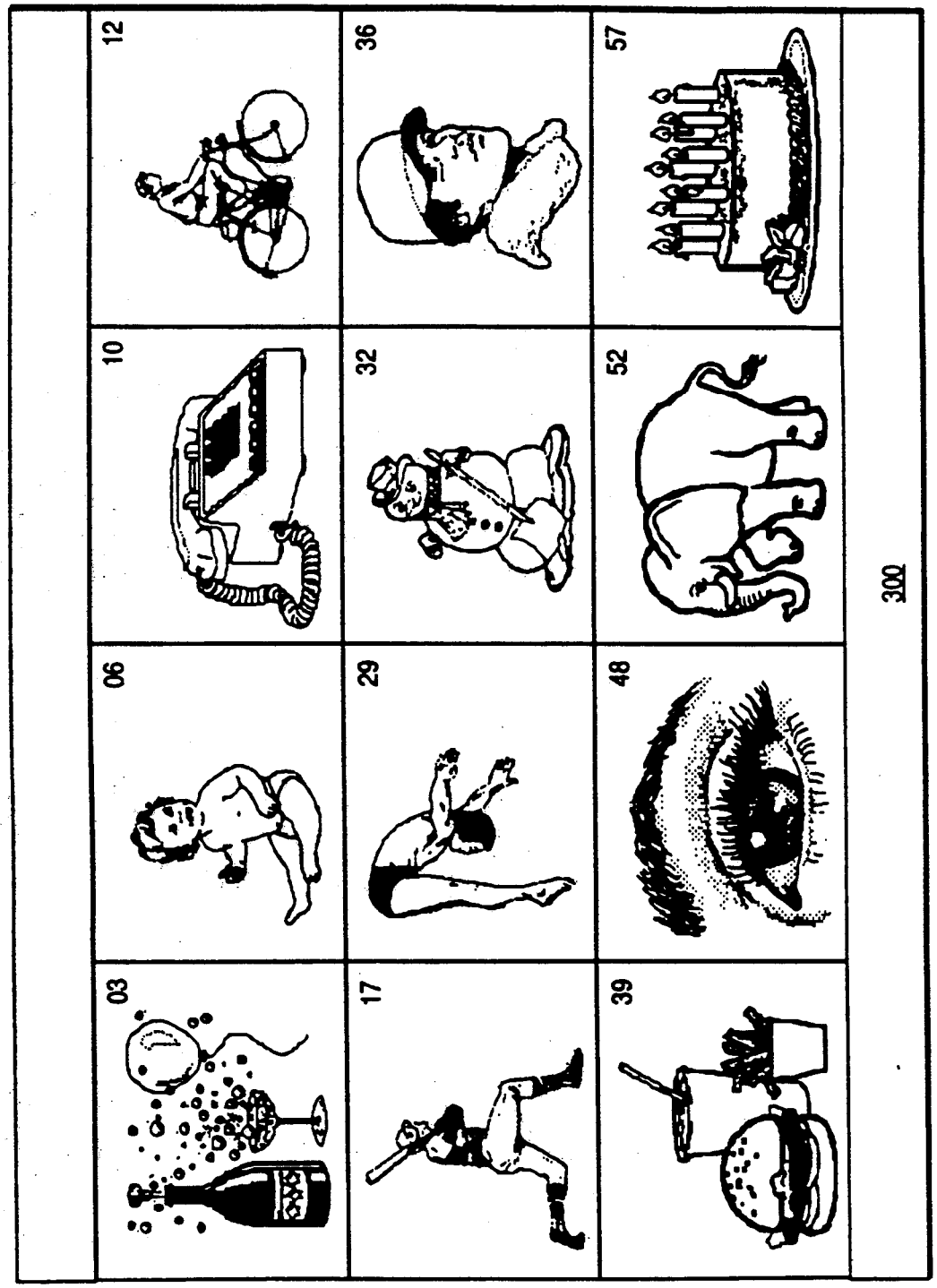
FIG. 3 illustrates a 3×4 matrix of images known from the prior art, but useful in understanding the invention.

Although, PIP unit 150 is capable of producing 2×2, 3×3, 3×4, 4×4, and 6×6 matrices of images, the subject system uses a 3×4 matrix for the channel sampler function, as shown in FIG. 3. A 3×4 matrix of images is felt to produce a pleasing and useful display for the channel sampler function. In the event that there are more than 12 active channels in the television receiver's scan list, PIP unit 150 can provide separate "pages" of multiple channel sample images by taking samples from the next 12 channels in the scan list in response to a second press of MULTI key 212 of keyboard. The first 12 images are preferably not stored in memory while the second 12 are displayed, in order to reduce the amount of memory that would be required.

Figure 2:
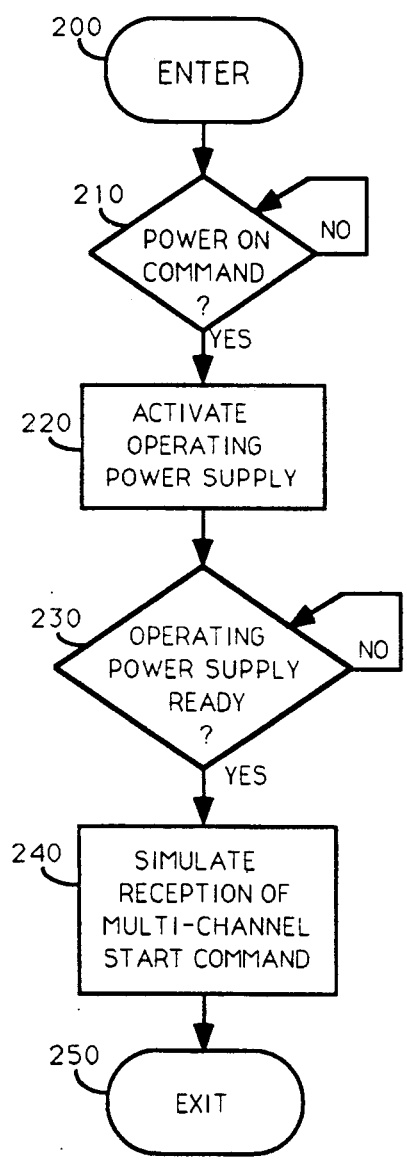
FIGS. 2, 4, and 5 illustrate flowcharts showing portions of a control program for the microcomputer of FIG. 1.

The present invention concerns automatic initiation of the channel sampling mode of operation. Referring to FIG. 2, in response to the detection of a power-on command (step 210) the operating power supply is activated, which in turn activates the receiver. In response to the detection of the "operating power supply ready" signal (230), controller 110 simulates the reception of a multi-channel start command( step 240), and proceeds to the section of the program code illustrated in FIG. 4, for controlling the channel sampling mode of operation. The section of the program illustrated in FIG. 2 is not reentered unless and until the television receiver is turned off. Description of the program steps of FIG. 4 is identical whether the multi-channel start command (MULTI) is simulated in response to the turning on of the receiver, or whether the command is actually generated by a user.

Figure 4:
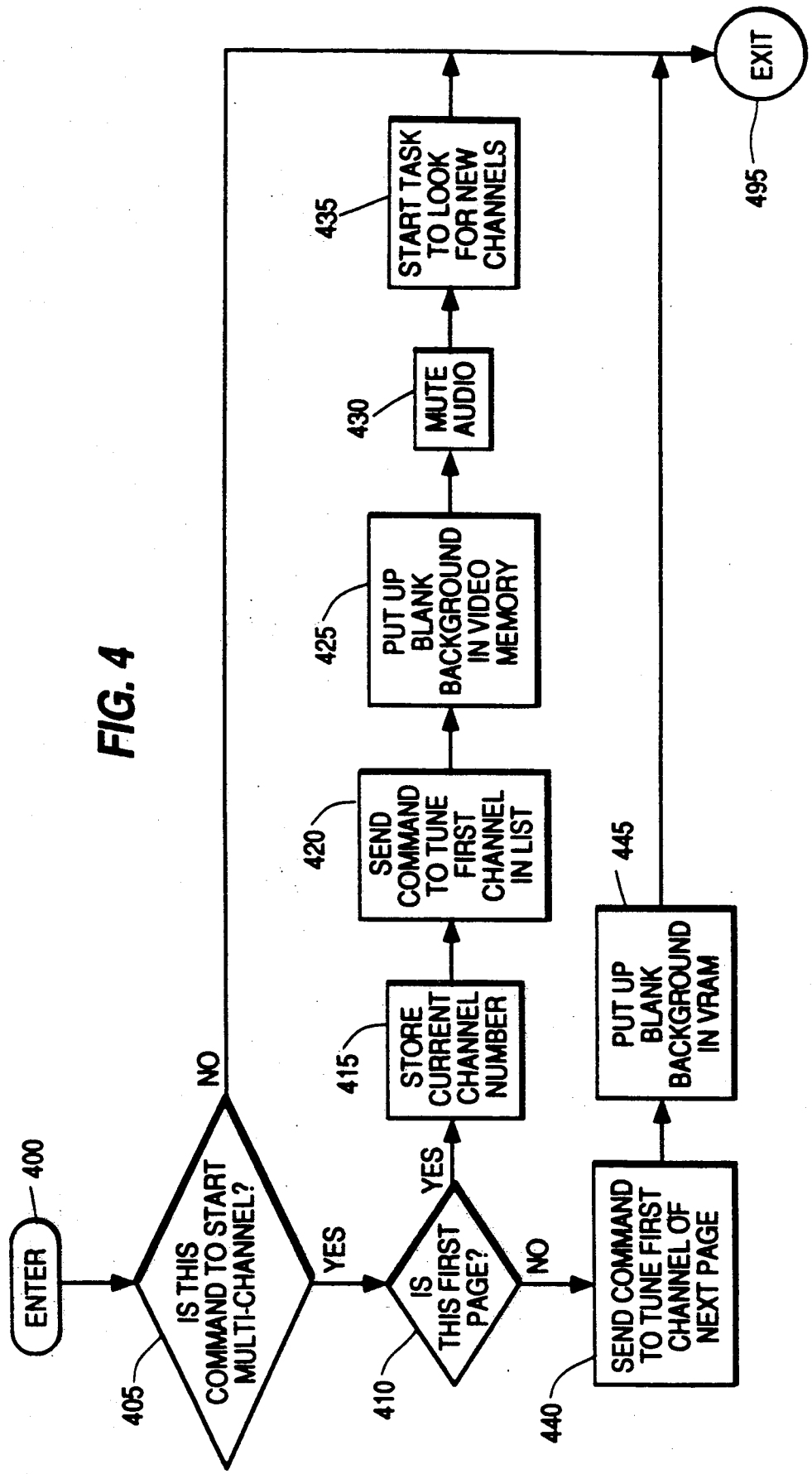

The flowchart of FIG. 4 is entered at step 400 from the keyboard decoding routines. At step 405 a determination is made as to whether the received keycode is the MULTI keycode. If not, the routine is exited at step 495. If the MULTI keycode has been received, then the YES path is taken to decision diamond 410 where a check is made to see if this is the first page of images (i.e., pictures from the first 12 channels in the scan list). If so, the channel number of the currently tuned channel is stored (step 415). A command is sent to tuner 102 to begin tuning the first channel in the scan list (step 420). A separate user-enterable scan list may be provided for either the automatic channel sampling function, the manually initiated channel sampling function, or both. The separate scan list may be programmed to contain only those channels which the viewer regularly watches, and would have the triple advantages of: (1) excluding the sampling of channels carrying programming which is not of interest to the viewer, (2) presenting the sampled images in whatever order is desired by the user; and (3) shortening the time necessary to complete the channel sampling function by eliminating the sampling of the undesired channels. Programming of this separate, alternate, scan list may be accomplished with the aid of a menu which is displayed on the display screen of the receiver.

Returning to the flowchart of FIG. 4, video memory 180 is cleared to a blank background (step 425), the audio is muted (step 430), controller 110 begins the task of looking for new channels (step 435), and the routine is exited. The task of beginning to look for new channels entails setting a flag, such that whenever a new channel is tuned, the program segment illustrated in the flowchart of FIG. 5 will be executed. If at step 410 it was decided that this was not the first page of images, then the NO path is taken to step 440. At step 440 controller 110 issues a command to tuner 102 to begin tuning the first channel in the next set of 12 channels in the scan list. In step 445 video memory 180 is cleared to a blank background and the program is exited.

Figure 5:
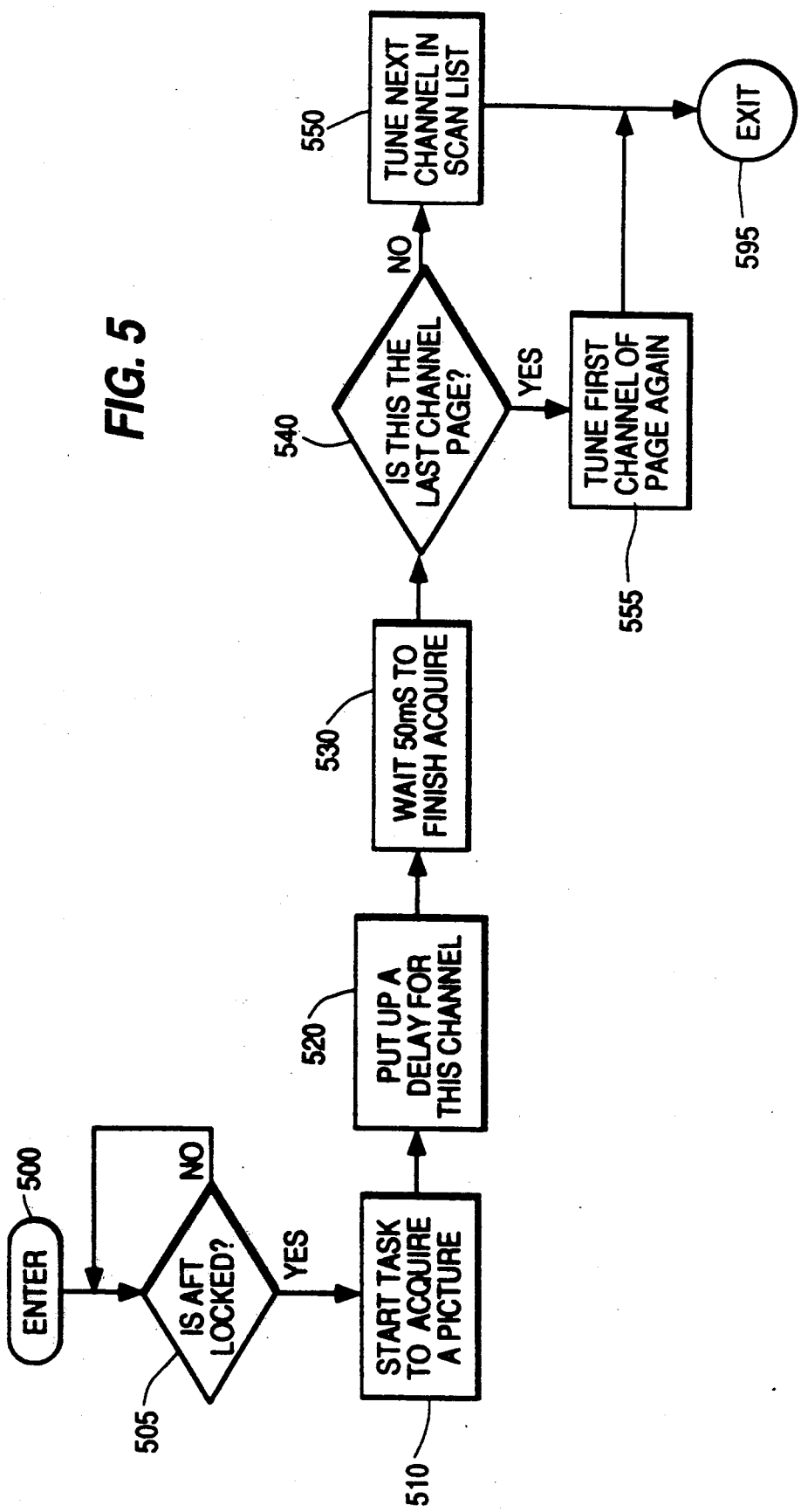

The routine, illustrated in FIG. 5, to process new channels during the channel sampler mode is entered at step 500 from the new channel number routines. At step 505 a decision is made as to whether the automatic fine tuning (AFT) has locked (i.e., is the new channel fully tuned?). If not, then the program loops until the AFT is locked, at which point the YES path is taken to step 510. At step 510, the acquire command is sent to PIP unit 150, and the program is advanced to step 520. In step 520, a channel number is displayed for the currently tuned channel (as shown in the upper right corner of the individual images of FIG. 3). At step 530 a 50 millisecond delay is executed to ensure that a full frame of video is acquired. A decision is made at step 540 as to whether this is the last channel of the page. If not, the next channel in the scan list is tuned (step 550). If so, the first channel of the current page is tuned (step 555), and the routine is exited at step (595).

It is known from the prior art to cause the continuous updating of the displayed multichannel images until ordered to tune a channel by a viewer. However, it is herein recognized that it may be desirable that controller 110 cause the images to be updated for a predetermined period of time, for example 30 seconds, and then cause tuner 102 to tune the last channel previously watched by the viewer.

It is also herein recognized that it is desirable to abort the channel sampler mode of operation, and immediately tune a channel in response to a channel change command issued by the user, regardless of whether the multi-channel start command was received or simulated.

Although the use of the AFT LOCK signal set forth in the above-described embodiment is preferable because of the shorter time required to assemble the 12 image display, the invention may also be practiced with the use of the simple time delay as known from the above-mentioned RCA VPT-695 VCR. As an alternative to the AFT LOCK signal, one skilled in the art will quickly realize that other signals, such as a Valid Sync signal produced by synchronizing signal detection circuitry could also be used to practice the invention, because a Valid Sync signal is also indicative of the completion of the tuning process for a particular channel.

It is also recognized herein that many viewers do not know what program they want to view when they first turn on their television receivers, because they are not aware of what programs are currently being transmitted. Thus, the channel sampler function is most desirable at the time when the receiver is turned on. Many viewers are unaware that the tuner of the television receiver is fully functional within several hundred milliseconds of the turning on of the television receiver. These viewers regard the onset of the displayed picture as an indication that the television receiver is operationally ready. That is, many viewers erroneously believe that they must wait for a picture to appear before changing channels. Such a misinformed viewer may feel that he has to wait 7 to 12 seconds for the picture tube to warm up before issuing a channel sampler command from the remote control unit, and then wait another 5 before he can select a channel. This 12 to 15 second waiting period may seem too long to a viewer.

In any case, it is an advantage of the subject invention that the process of sampling the available channels is performed while the screen of the television receiver is dark during warm-up of the picture tube. Thus, when the picture tube "lights up" (i.e., when it begins displaying a picture), the multi-channel images are immediately displayed.

The term "television receiver", as used herein, includes television receivers having a display device (commonly known as television sets), and television receivers without a display device, such as videocassette recorders (VCR's).

The term "television receiver" as used herein is intended to include television monitor/receivers having an RF tuner and baseband signal input circuitry.

What is claimed is:

1. A system for a television receiver, comprising:
   tuner demodulator means having an input for receiving a plurality of radio frequency signals, and having a control input for receiving a first control signal, said tuner demodulator means tuning one of said radio frequency signals in response to said first control signal and producing a detected video signal therefrom at an output;
   memory means having data representing a list of television channels stored therein;
   processing means coupled to said output of said tuner demodulator means for receiving said detected video signal, for storing a predetermined amount of said video signal, and for producing a display signal which when displayed on a display screen produces a display comprising an inset-image displayed in one of a plurality of inset-image locations, said inset-image being related to said stored video signal,
   control means for controlling said tuner demodulator means and for controlling said processing means, said control means having an output for developing said first control signal;
   said control means in response to the turning-on of said television receiver automatically causes said tuner-demodulator means to tune a first television channel from said list of television channels, automatically causes said processing means to store said predetermined amount of signal, and automatically causes said display of said inset-image;
   said control means repeating said tuning, storing, and displaying functions for each of a predetermined number of television channels from said list of channels, and upon completing said functions for said predetermined number of television channels displays a multi-image display for a predetermined time period to allow a user to enter a channel selection;
   said control means, in the absence of a user-entered channel selection within said predetermined time period, causes said tuner means to select the last channel viewed by said user before said receiver was turned off.

2. A system for a television receiver, comprising:
   tuner demodulator means having an input for receiving a plurality of radio frequency signals, and having a control input for receiving a first control signal, said tuner demodulator means tuning one of said radio frequency signals in response to said first control signal and producing a detected video signal therefrom at an output;
   memory means having data representing a list of television channels stored therein;
   processing means coupled to said output of said tuner demodulator means for receiving said detected video signal, for storing a predetermined amount of said video signal, and for producing a display signal which when displayed on a display screen produces a display comprising an inset-image displayed in one of a plurality of inset-image locations, said inset-image being related to said stored video signal;
   control means for controlling said tuner demodulator means and for controlling said processing means, said control means having an output for developing said first control signal;
   said control means in response to the turning-on of said television receiver automatically causes said tuner-demodulator means to tone a first television channel from said list of television channels, automatically causes said processing means to store said predetermined amount of signal, and automatically causes said display of said inset-image; and
   wherein said control means causes said tuner means to tune each of said channels represented in said list of said memory means and causes said processing means to store said predetermined amount of said video signal for each of said channels; and
   further including a display screen for displaying said image, and wherein said tuning of at least one of said channels in said list of channels, and said storing of at least one of said predetermined amounts of said video signal is accomplished while said display screen is not displaying an image.

3. A system for a television receiver, comprising:
   a power supply for supplying power to components of said television receiver during normal operation of said television receiver;
   data entry means for generating data signals in response to activation by a user;
   tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output;
   memory means having data representing a list of television channels stored therein;
   processing means coupled to said first output of said tuner demodulator means for receiving said detected video signal, for storing a predetermined amount of said video signal, and for producing a display signal which when displayed on a display screen produces a display comprising an inset-image displayed in one of a plurality of inset-image locations, said inset-image being related to said stored video signal,
   control means for controlling said tuner demodulator means and for controlling said processing means, said control means having a first input coupled to said data entry means for receiving said data signals, having an output for developing said first control signal, said control means also controlling the activation of said power supply;
   said control means in response to predetermined ones of said data signals activates said power supply, automatically causes said tuner-demodulator means to tone a first television channel from said list of television channels, automatically causes said processing means to store said predetermined amount of signal, and automatically causes said display of said inset-image, said predetermined ones of said data signals being representative of a user-entered command to turn on said television receiver.

4. The system of claim 3, wherein said control means causes said tuner means to tune each of said channels represented in said list of said memory means and causes said picture-in-picture processing means to store said predetermined amount of said video signal for each of said channels.

5. A picture-in-picture system for a television receiver, comprising:
data entry means for generating data signals in response to activation by a user;
a standby power supply for supplying power to components of said television receiver during at least a standby mode of operation of said television receiver;
an operating power supply switchable between active and passive states;
tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output, and having a second output for producing a feedback signal indicative of substantial completion of the tuning of a television channel;
picture-in-picture processing means coupled to said first output of said tuner demodulator means for receiving said detected video signal, for storing in response to a second control signal a predetermined amount of said video signal, and for producing a display signal which when displayed on a display screen produces a display comprising an inset-image displayed in one of a plurality of inset-image locations, said inset-image being related to said stored video signal,
control means for switching said operating power supply between said active and passive states, for controlling said tuner demodulator means, and for controlling said picture-in-picture processing means, said control means having a first input coupled to said data entry means for receiving said data signals, having a second input coupled to said tuner-demodulator means for receiving said feedback signal, having a first output for developing said first control signal, and having a second output for developing said second control signal;
said standby power supply being coupled to said control means for providing power to said control means during said passive state of said operating power supply;
said control means in response to predetermined ones of said data signals activates said operating power supply, and generates said first output signal causing said tuner-demodulator means to tune a first television channel, and in response to said feedback signal generates said second control signal causing said picture-in-picture processing means to store said predetermined amount of signal, and automatically causes said display of said inset-image, said predetermined ones of said data signals being representative of a user-entered command to turn on said television receiver.

6. The picture-in-picture system of claim 5, wherein said control means causes said tuner means to tune each of said radio frequency signals of said plurality of radio frequency signals and causes said picture-in-picture processing means to store said predetermined amount of said video signal for each of said channels.

7. An automatic channel sampling system for a television receiver, comprising:
tuner demodulator means having an input for receiving a plurality of radio frequency signals, said tuner demodulator means tuning one of said radio frequency signals in response to a first control signal and producing a detected video signal therefrom at a first output, and having a second output for producing a feedback signal indicative of substantial completion of the tuning of a television channel;
data entry means for generating data signals in response to activation by a user;
memory means for storing a group of data entered by a user representative of a list of television channels and for storing data representative of said detected video signal;
processing means coupled to said memory means and said first output of said tuner demodulator means for receiving said detected video signal, for storing in response to a second control signal a predetermined amount of said video signal, and for producing a display signal which when displayed on a display screen produces a display comprising an inset-image displayed in one of a plurality of inset-image locations, said inset-image being related to said stored video signal;
control means for controlling said tuner demodulator means and for controlling said processing means, said control means having a first input coupled to said data entry means for receiving said data signals, having a second input coupled to said tuner-demodulator means for receiving said feedback signal, having a first output for developing said first control signal, and having a second output for developing said second control signal;
said control means in response to the turning on of said receiver generates said first output signal causing said tuner-demodulator means to tune a first television channel from said list of television channels, and in response to said feedback signal generates said second control signal causing said processing means to store said predetermined amount of signal, and automatically causes said display of said inset-image.

8. The system of claim 7, wherein said control means causes said tuner means to tune each of said channels represented in said stored list of television channels and causes said processing means to store said predetermined amount of said video signal for each of said channels, and automatically causes a display of multiple inset-images each said inset-image corresponding to a respective one of said channels.

9. The system of claim 8, further including a display screen for displaying said image, and wherein said tuning of at least one of said channels in said list of channels, and said storing of at least one of said predetermined amounts of said video signal is accomplished while said display screen is not displaying an image.

10. A system for a television receiver, comprising:

tuner demodulator means having an input for receiving a plurality of radio frequency signals corresponding to a plurality of television channels, and having a control input for receiving a first control signal, said tuner demodulator means tuning one of said radio frequency signals corresponding to a particular television channel in response to said first control signal and producing a detected video signal therefrom at a first output;

processing means coupled to said first output of said tuner demodulator means for receiving said detected video signal, for storing a predetermined amount of said video signal, and for producing a display signal which when displayed on a display screen produces a display comprising an inset-image displayed in one of a plurality of inset-image locations, said inset-image being related to said stored video signal, control means for controlling said tuner demodulator means and for controlling said processing means, said control means having an output for developing said first control signal;

said control means in response to the turning-on of said television receiver automatically causes said tuner-demodulator means to tune a first television channel of said plurality of television channels, automatically causes said processing means to store said predetermined amount of signal, and automatically causes said display of said inset-image;

said control means repeating said tuning, storing, and displaying functions for each of a predetermined number of television channels from said list of channels, and upon completing said functions for said predetermined number of television channels displays a multi-image display for a predetermined time period to allow a user to enter a channel selection;

said control means, in the absence of a user-entered channel selection within said predetermined time period, causes said tuner means to select the last channel viewed by said user before said receiver was turned off.

11. A system for a television receiver, comprising:

tuner demodulator means having an input for receiving a plurality of radio frequency signals corresponding to a plurality of television channels, and having a control input for receiving a first control signal, said tuner demodulator means tuning one of said radio frequency signals corresponding to a particular television channel in response to said first control signal and producing a detected video signal therefrom at a first output;

processing means coupled to said first output of said tuner demodulator means for receiving said detected video signal, for storing a predetermined amount of said video signal, and for producing a display signal which when displayed on a display screen produces a display comprising an inset-image displayed in one of a plurality of inset-image locations, said inset-image being related to said stored video signal;

control means for controlling said tuner demodulator means and for controlling said processing means, said control means having an output for developing said first control signal;

said control means in response to the turning-on of said television receiver automatically causes said tuner-demodulator means to tune a first television channel of said plurality of television channels, automatically causes said processing means to store said predetermined amount of signal, and automatically causes said display of said inset-image;

wherein said control means causes said tuner means to tune a second one of said television channels of said plurality of television channels and causes said processing means to store said predetermined amount of said video signal for said second channel, and further including a display screen for displaying said image, and wherein said tuning of at least one of said channels, and said storing of at least one of said predetermined amounts of said video signal is accomplished while said display screen is not displaying an image.

* * * * *

UNITED STATES PATENT AND TRADEMARK OFFICE
CERTIFICATE OF CORRECTION

PATENT NO. :      5,194,954
DATED      :      March 16, 1993
INVENTOR(S) :     David J. Duffield It is certified that error appears in the above-identified patent and that said Letters Patent is hereby corrected as shown below:

On the title page, under [56] References Cited, add the following:

Schematic Diagrams of Section PIP MBTV 5001 M of Television Receiver Chassis Model IMC, Deutsche Thomson Brandt, Villingen, Germany, 5 September 1988

Column 8, line 20, that portion reading "tone" should read -- tune --
Column 9, line 2,  that portion reading "tone" should read -- tune --

Signed and Sealed this

Eleventh Day of January, 1994

Attest:

BRUCE LEHMAN

*Attesting Officer*          *Commissioner of Patents and Trademarks*